(12) United States Patent
Chakraborty et al.

(10) Patent No.: US 8,370,819 B2
(45) Date of Patent: Feb. 5, 2013

(54) MECHANISM TO STORE INFORMATION DESCRIBING A VIRTUAL MACHINE IN A VIRTUAL DISK IMAGE

(75) Inventors: Parag Chakraborty, Bellevue, WA (US); Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 11/089,951

(22) Filed: Mar. 25, 2005

(65) Prior Publication Data

US 2006/0218544 A1 Sep. 28, 2006

(51) Int. Cl.
*G06F 9/45* (2006.01)
(52) U.S. Cl. ........ 717/148; 717/121; 717/140; 717/149; 718/1; 703/27
(58) Field of Classification Search ........................ None
See application file for complete search history.

(56) References Cited

U.S. PATENT DOCUMENTS

| | | | |
|---|---|---|---|
| 7,203,944 B1* | 4/2007 | van Rietschote et al. | 718/104 |
| 7,278,030 B1* | 10/2007 | Chen et al. | 713/189 |
| 7,356,679 B1* | 4/2008 | Le et al. | 713/1 |
| 7,437,764 B1* | 10/2008 | Sobel et al. | 726/25 |
| 7,577,722 B1* | 8/2009 | Khandekar et al. | 709/220 |
| 2002/0147862 A1* | 10/2002 | Traut et al. | 710/1 |
| 2003/0191911 A1* | 10/2003 | Kleinschnitz et al. | 711/154 |
| 2006/0136912 A1* | 6/2006 | Robinson et al. | 718/1 |
| 2006/0155667 A1* | 7/2006 | Tolba | 707/1 |
| 2006/0184937 A1* | 8/2006 | Abels et al. | 718/1 |

\* cited by examiner

*Primary Examiner* — Isaac Techklu
(74) *Attorney, Agent, or Firm* — Woodcock Washburn LLP (57) ABSTRACT

A mechanism is provided for making information about the virtual disk image file and/or its associated virtual image configuration file more readily available to a user. The virtual disk image file format is expanded to include fields in which information about the data in the file can be stored. Extensible information on file content, compatible HW configurations, compatible host OSes, timeout status, DRM status, patch state, and network topology, tag data for indexing, configuration files, saved state files, operation history data, and the like is stored in a location within a virtual disk image file that can be read without executing the virtual machine. This information can then be used to search the contents of the virtual disk image, to enforce usage policies, to provide extensibility for vendors, and the like.

20 Claims, 7 Drawing Sheets

MECHANISM TO STORE INFORMATION DESCRIBING A VIRTUAL MACHINE IN A VIRTUAL DISK IMAGE

FIELD OF THE INVENTION

The invention is directed to systems and methods for storing information describing a virtual machine (VM) for use by a virtual machine creator. More particularly, the invention is directed to systems and methods for expanding a virtual disk image file format to include a field in which information (e.g., on file content, compatible hardware configurations, compatible host operating systems, digital rights management (DRM) status, patch state, and the like) about the data in the virtual disk image file may be stored and accessed without executing the VM.

BACKGROUND OF THE INVENTION

Figure 1:
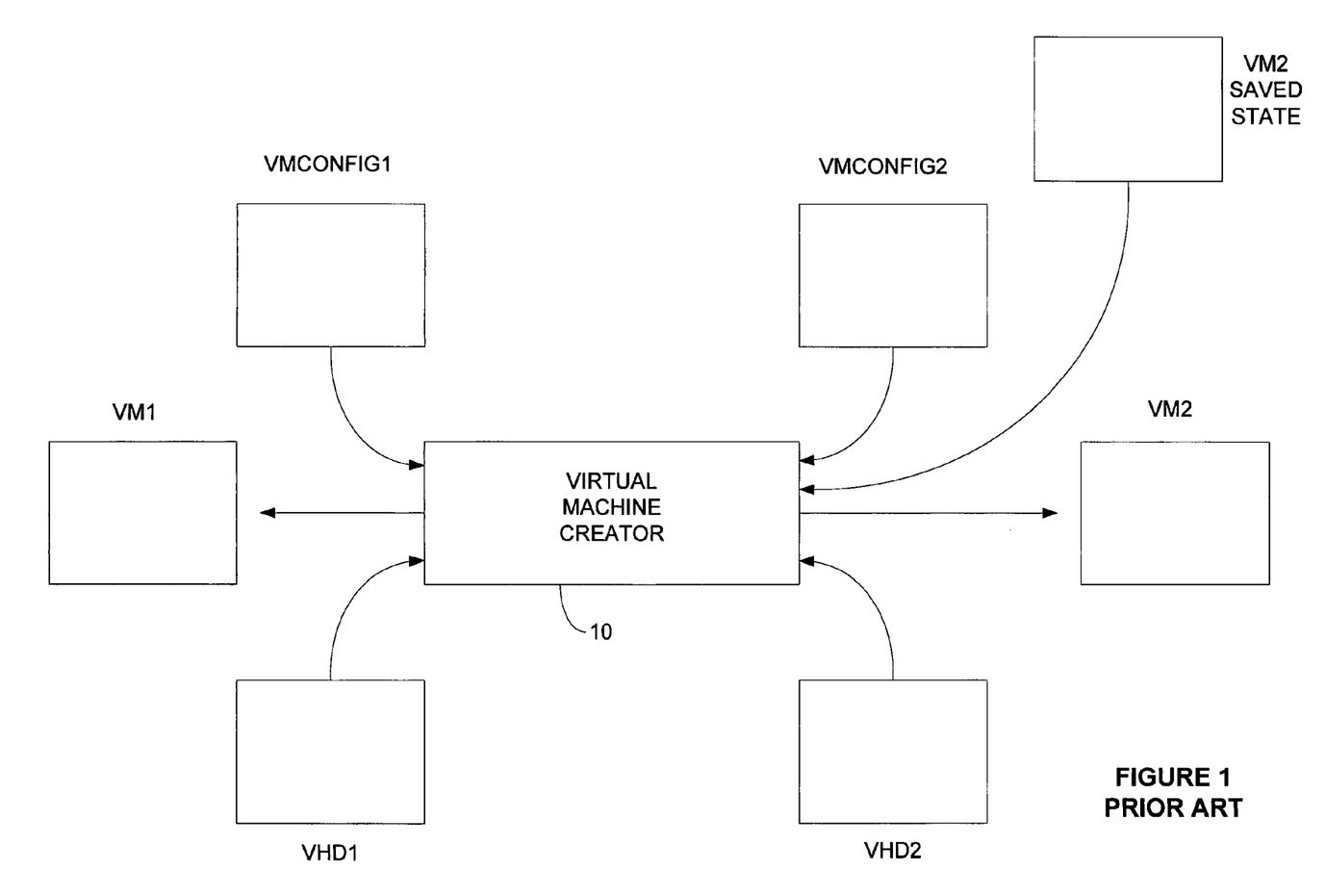
FIG. 1 illustrates the creation of virtual machines (VMs) by a conventional virtual machine creator application.

To create a virtual machine (VM), virtual machine software, such as Microsoft's Virtual Server, starts an instance of a virtual machine creator that creates the desired VM from multiple stored files. As shown in FIG. 1, the virtual machine creator 10 creates a first VM (VM1) using a VM configuration file (VM Config1) that includes information explaining the machine (system) configuration of the VM to be created and a virtual hard disk (VHD1) that stores a virtual disk image file representing a hard drive (disk) in a VM environment. In other words, the files VHD1 and VM Config1 together provide the information needed by VM creator 10 to create VM1. Similarly, the files VHD2 and VM Config2 together provide the information needed by VM creator 10 to create VM2. As illustrated in FIG. 1, a saved state of the memory contents of the VM may be used by VM creator 10 to relaunch VM2 so that VM2 starts at a preselected saved state. Conventional virtual machine applications, such as Virtual VPC 2004 and Virtual Server 2005 from Microsoft Corporation, allow users to save the running state of a virtual machine and restore it at a later point of time. The saved state file contains all the memory contents of a VM at the point it was saved as well as the state of all the devices that were running in the VM.

As illustrated in FIG. 1, a virtual machine application needs a minimum of two files to launch a virtual machine. They are the virtual disk image file (VHD) and the virtual machine configuration file (VM CONFIG). The virtual machine creator application 10 may read information from this file and construct a virtual machine. However, to move a VM from one physical machine to another, the user has to move both the VHD and VM CONFIG files. Moreover, there is no way an administrator can enforce that a particular VM configuration file is used with a particular disk image. As a result, a user can create a new VM and attach a disk image to it, even if it is from the wrong one. Also, if virtual machines are check-pointed, then there are multiple saved state files that represent the virtual machine at different points in time. Maintaining all these saved state files can be a tedious process and make migration of virtual machines cumbersome. An improved VM migration technique is desired.

Virtual machine hard disks (VHDs) are virtualized in the form of files that reside on the native host file system. Each virtual hard disk type has its own standard file format that varies by VHD type. There are several types of VHDs; the following types of VHD formats are supported by Microsoft Virtual PC and Virtual Server:

Fixed hard disk;
Dynamic hard disk;
Differencing hard disk;

Unfortunately, as noted below, the file structures and file formats of conventional VHDs limit the uses of VHDs by the VM creator 10.

In particular, conventional VHD file formats provide a mechanism to layout the VM disk data in a file; however, conventional VHD file formats do not provide a mechanism to store information that provides more detail about what data is stored in the VHD and the characteristics of that data. Accordingly, to learn more about the stored VHD data from the disk image, the user has to attach the disk image to the VM, launch the VM using the VM creator 10, and then read the contents through the VM. This is an expensive and tedious operation.

To illustrate this, suppose a user needs the ability to find out if a VM has been patched or not. If it has been patched, the user would like to know to what level it has been patched and whether it is safe to start up the VM or not. This information is very valuable as the user would prefer to find out the patch information and make a decision if he/she wants to start a virtual machine. By checking the patch state, the user can potentially stop an un-patched VM from connecting to the network and create a vulnerable point on the network. Unfortunately, as just noted, the user conventionally has to start the VM to check the patch state. A solution is desired whereby the user may check the VHD data without starting the VM.

The conventional VHD file formats also do not provide any mechanism to store information that can help a policy engine to make decisions on whether a virtual disk image could be used by a particular hardware environment, or by a particular user. As a result, the conventional VHD file formats do not permit a user to create a virtual disk image and install operating systems and/or applications and to safely distribute the VM on the Internet. This is because any virtual machine product which understands the current file format will be able to use the operating system and application present in the virtual disk image. It is desired to provide a mechanism whereby a policy engine can decide if a particular user may or may not use the operating system/application present in a particular virtual disk image.

The conventional VHD file formats further do not provide a mechanism to store information that specifies the type of physical hardware on which the operating system inside the virtual hard disk image can run. This is desirable since a VM can typically move from one physical machine to another, provided that some of the hardware components (e.g. processors) are identical. This knowledge is crucial to enable a VM system to decide if it can move a live VM to another physical machine. It is thus desirable to provide a mechanism by which a policy engine can decide if a particular VM can move from one physical machine to another physical machine.

The conventional VHD file formats do not provide a robust mechanism to enforce a timeout policy that would allow an administrator to publish disk images which can be used only for a certain period, or only during a certain period of time in the day. It is desirable to provide a mechanism by which the policy engine may monitor if the virtual disk image has expired or is unusable at a particular time of day.

The conventional VHD file formats do not provide any mechanism to store DRM information. Without any DRM information, the virtual disk image cannot be used as a vehicle for software distribution. It is desired to provide sufficient DRM protections so as to enable a software vendor to create a virtual disk image with its application installed in it for distribution on the Internet to users, who would be able to download their license keys separately to use the virtual disk image.

The conventional VHD file formats do not provide any mechanism to control the usage of a virtual disk image in a particular network environment such that, for example, a system administrator may setup certain virtual machines so that they can run only in a secure network environment. It is desired to create a VM environment in which an illegal user cannot get access to the virtual disk images and launch a virtual machine from a virtual disk image in an environment different from the intended one.

As a convenience to VM users, it is also desirable for VM users to be able to quickly search a virtual disk image to determine its contents. Conventionally, given a large number of disk images, if a user has to find a particular disk image, he has to attach the virtual disk image to a virtual machine and start it up to find out if it contains what he is looking for. The other option is for the user to uniquely name the disk images or to store them in separate uniquely named folders that may be very tedious to setup and maintain. A better way to search virtual disk images is desired.

In addition, the conventional virtual disk image file format does not allow third party vendors to add custom information without modifying the file format. This restricts the extensibility of the format. For example, an anti-virus product might want to store some information that indicates whether a virtual machine disk image was checked for infection. Unfortunately, in the conventional implementation of the VHD there is no way to store this information in the file without modifying the file format. An extensible mechanism is desired that enables metadata to be stored in a virtual machine disk image.

In conventional virtual disk image file formats, there is also no mechanism for a user to store notes related to the modifications made to a virtual disk image. Such a mechanism is desired.

SUMMARY OF THE INVENTION

The present invention addresses the numerous needs in the art mentioned above by storing content related information in an extensible manner in the virtual disk image. In particular, the present invention addresses the above limitations in the art by adding a section for content and other related information into the virtual disk image file format so that an application may open the disk image and read this section without starting the VM. For example, patch-related information may be stored in the virtual disk image and used by updater programs to monitor and perform offline patching of the virtual disk images.

In addition, the virtual machine configuration file and saved state file may be stored inside the virtual disk image. As a result of storing the virtual machine configuration file in the virtual disk image, the virtual machine application may extract the configuration data from the virtual disk image and launch the virtual machine. This couples the virtual machine information with the disk image. As a result, if an administrator needs to distribute a virtual disk image with a particular application installed in it to a number of users, the administrator may create a virtual machine configuration which caters to the application's system requirements and store it in the virtual disk image. The virtual machine creator application may then use the configuration stored in the disk image instead of using another configuration file. Since the virtual machine application will always use the settings stored in the virtual disk image, the administrator does not have to solve issues in which users have incorrect configuration settings. On the other hand, storing the virtual machine saved state file in the virtual disk image is particularly useful when the virtual machines are check-pointed. This not only reduces the number of files associated with a particular virtual machine, but also tightly couples the saved state information with the corresponding disk image.

The above limitations in the art are also addressed by storing the following information in a section in the virtual disk image file format: operating system/application license information, physical hardware information, time out information, DRM information, and network topology/hardware environment information that may be read by, for example, a policy engine to decide if a particular user may or may not use an operating system/application present in a particular virtual disk image, if a particular VM may move from one physical machine to another, if the virtual disk image has expired or is no longer usable, and the like.

Tag information may also be stored in the virtual disk image file format to tag disk images that are then read and indexed by an indexing engine to quickly retrieve a particular disk image. Some of the things that a user may prefer to tag include the operating system name and version, applications installed in the virtual disk image and their versions, intended workload (e.g., application server versus database), the person or organization who created the image, the person or organization responsible for maintaining and patching the image, hardware (performance, bandwidth, topology) requirements or preferences for the workload contained within the image, and any custom tag that is related to a user's environment. For example, virtual disk images may be tagged for use only by the accounting department.

Another section may also be added to the virtual disk image file format in accordance with the invention for extensible storage of content information about the virtual image disk data. For example, such data may be stored in the form of XML since the schema may be extended without modifying the virtual disk image file format. This extensibility will allow other vendors to add more information to the virtual disk image.

In accordance with another aspect of the invention, a section is added to the virtual disk image file format that lets the user store notes related to a virtual machine and to append information to this field. For example, the user may maintain a history of different operations that have been performed on a particular virtual disk image.

The invention also contemplates corresponding methods and computer readable media for implementing the virtual machine system of the invention. These and other features and advantages of the invention will be apparent to those skilled in the art based on the following detailed description of the invention.

BRIEF DESCRIPTION OF THE DRAWINGS

The systems and methods for storing information in a virtual disk image in accordance with the present invention are further described with reference to the accompanying drawings, in which.

DETAILED DESCRIPTION OF ILLUSTRATIVE EMBODIMENTS

Certain specific details are set forth in the following description with respect to FIGS. 1-4 to provide a thorough understanding of various embodiments of the invention. Certain well-known details often associated with computing and software technology are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Overview

A mechanism is provided for making information about the virtual disk image file and/or its associated virtual image configuration file more readily available to a user. The virtual disk image file format is expanded to include fields in which information about the data in the file can be stored. Extensible information on file content, compatible HW configurations, compatible host OSes, timeout status, DRM status, patch state, and network topology, tag data for indexing, configuration files, saved state files, operation history data, and the like is stored in a location within a virtual disk image file that can be read without executing the virtual machine. This information can then be used to search the contents of the virtual disk image, to enforce usage policies, to provide extensibility for vendors, and the like.

Other more detailed aspects of the invention are described below, but first, the following description provides a general overview of and some common vocabulary for virtual machines and associated terminology as the terms have come to be known in connection with operating systems and the host processor ("CPU") virtualization techniques. In doing so, a set of vocabulary is set forth that one of ordinary skill in the art may find useful for the description that follows of the systems and methods for expanding virtual file disk formats in accordance with the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the Guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC <->x86), two approaches could be used: instruction-by-instruction emulation (relatively slow) or translation from the Guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating systems are virtualized and thus an exemplary scenario in accordance with the invention would be emulation of a Windows 95®, Windows98®, Windows 3.1, or Windows NT 4.0 operating system on a Virtual Server available from Microsoft Corporation. In various embodiments, the invention thus describes systems and methods for controlling Guest access to some or all of the underlying physical resources (memory, devices, etc.) of the host computer, including the NDIS IM drivers.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a-guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 2A.

Figure 2A:
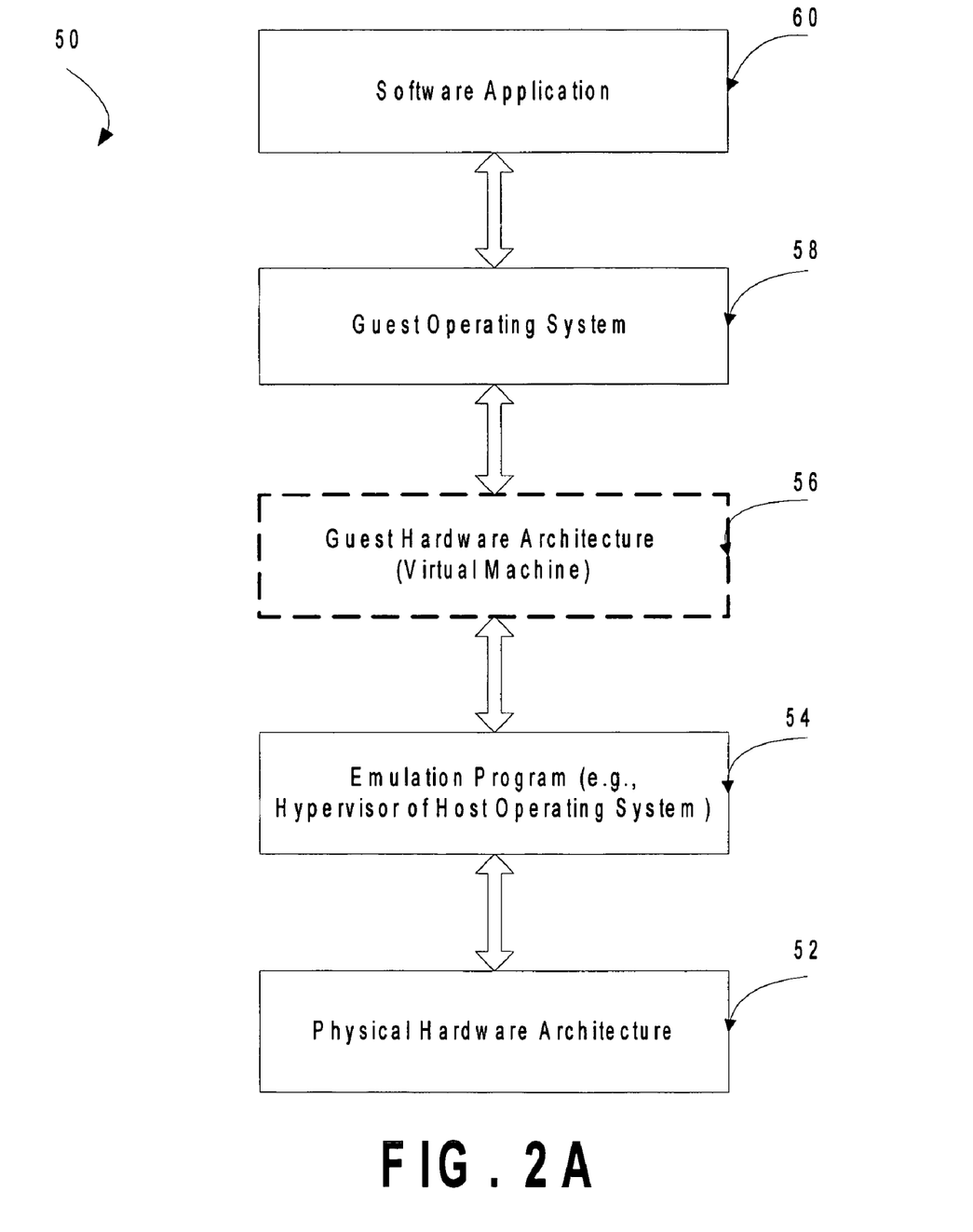
FIG. 2A is a block diagram representing the logical layering of the hardware and software architecture for an emulated operating environment in a computer system.

FIG. 2A is a diagram representing the logical layering of the hardware and software architecture for an emulated operating environment in a computer system. In the figure, an emulation program 54 runs directly or indirectly on the physical hardware architecture 52. Emulation program 54 may be (a) a virtual machine monitor that runs alongside a host operating system, (b) a specialized host operating system having native emulation capabilities, or (c) a host operating system with a hypervisor component wherein the hypervisor component performs the emulation. Emulation program 54 emulates a guest hardware architecture 56 (shown as broken lines to illustrate the fact that this component is the "virtual machine," that is, hardware that does not actually exist but is instead emulated by said emulation program 54). A guest operating system 58 executes on the guest hardware architecture 56, and software application 60 runs on the guest operating system 58. In the emulated operating environment of FIG. 2A—and because of the operation of emulation program 54—software application 60 may run in computer system 50 even if software application 60 is designed to run on an operating system that is generally incompatible with the host operating system and hardware architecture 52.

Figure 2B:
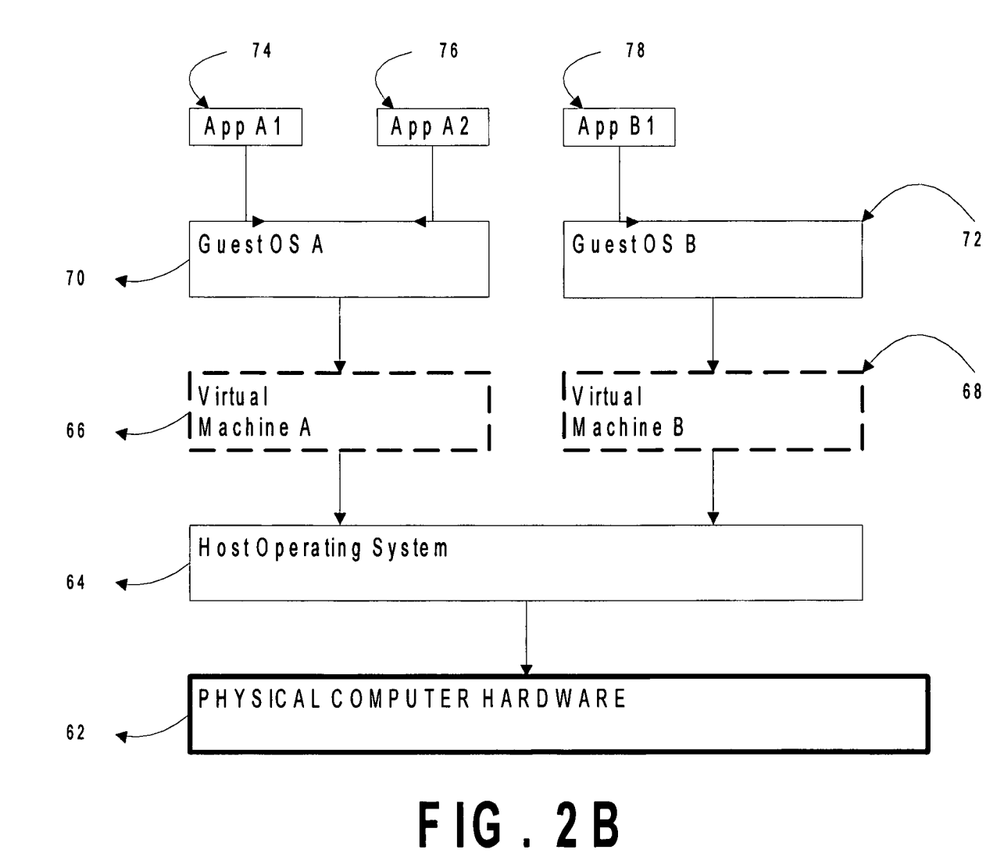
FIG. 2B is a block diagram representing a virtualized computing system wherein the emulation is performed by the host operating system (either directly or via a hypervisor)

FIG. 2B illustrates a virtualized computing system comprising a host operating system software layer 64 running directly above physical computer hardware 62 where the host operating system (host OS) 64 provides access to the resources of the physical computer hardware 62 by exposing interfaces that are the same as the hardware the host OS is emulating (or "virtualizing")—which, in turn, enables the host OS 64 to go unnoticed by operating system layers running above it. Again, to perform the emulation the host OS 64 may be a specially designed operating system with native emulations capabilities or, alternately, it may be a standard operating system with an incorporated hypervisor component for performing the emulation (not shown).

As shown in FIG. 2B, above the host OS 64 are two virtual machine (VM) implementations, VM A 66, which may be, for example, a virtualized Intel 386 processor, and VM B 68, which may be, for example, a virtualized version of one of the Motorola 680X0 family of processors. Above each VM 66 and 68 are guest operating systems (guest OSes) A 70 and B 72 respectively. Running above guest OS A 70 are two applications, application A1 74 and application A2 76, and running above guest OS B 72 is application B1 78.

In regard to FIG. 2B, it is important to note that VM A 66 and VM B 68 (which are shown in broken lines) are virtualized computer hardware representations that exist only as software constructions and which are made possible due to the execution of specialized emulation software(s) that not only presents VM A 66 and VM B 68 to Guest OS A 70 and Guest OS B 72 respectively, but which also performs all of the software steps necessary for Guest OS A 70 and Guest OS B 72 to indirectly interact with the real physical computer hardware 62.

Figure 2C:
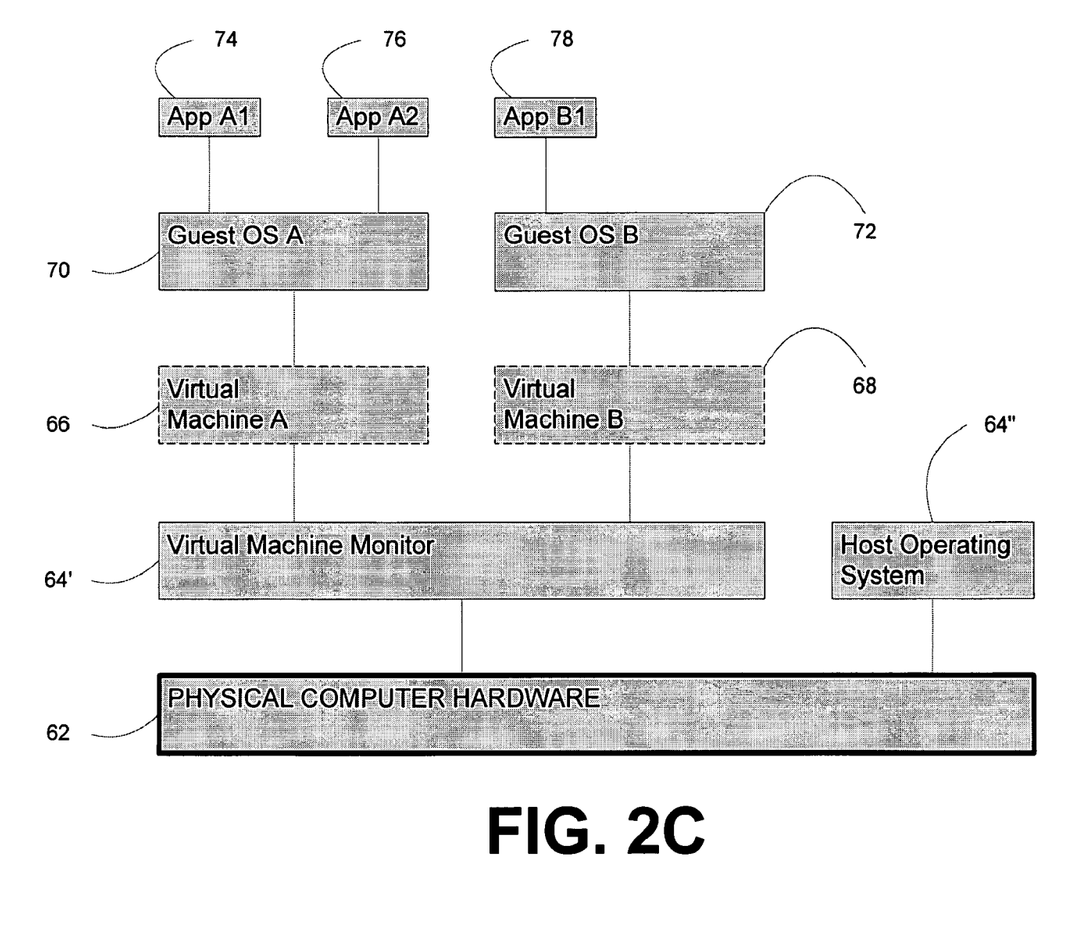
FIG. 2C is a block diagram representing an alternative virtualized computing system wherein the emulation is performed by a virtual machine monitor running side-by-side with a host operating system.

FIG. 2C illustrates an alternative virtualized computing system wherein the emulation is performed by a virtual machine monitor (VMM) 64' running alongside the host operating system 64". For certain embodiments the VMM 64' may be an application running above the host operating system 64" and interacting with the physical computer hardware 62 only through the host operating system 64". In other embodiments, and as shown in FIG. 2C, the VMM 64' may instead comprise a partially independent software system that on some levels interacts indirectly with the computer hardware 62 via the host operating system 64" but on other levels the VMM 64' interacts directly with the computer hardware 62 (similar to the way the host operating system interacts directly with the computer hardware). And in yet other embodiments, the VMM 64' may comprise a fully independent software system that on all levels interacts directly with the computer hardware 62 (similar to the way the host operating system 64" interacts directly with the computer hardware 62) without utilizing the host operating system 64" (although still interacting with said host operating system 64" insofar as coordinating use of the computer hardware 62 and avoiding conflicts and the like).

All of these variations for implementing the virtual machine are anticipated to form alternative embodiments of the present invention as described herein, and nothing herein should be interpreted as limiting the invention to any particular emulation embodiment. In addition, any reference to interaction between applications 74, 76, and 78 via VM A 66 and/or VM B 68 respectively (presumably in a hardware emulation scenario) should be interpreted to be in fact an interaction between the applications 74, 76, and 78 and the virtualizer that has created the virtualization. Likewise, any reference to interaction between applications VM A 66 and/or VM B 68 with the host operating system 64 and/or the computer hardware 62 (presumably to execute computer instructions directly or indirectly on the computer hardware 62) should be interpreted to be in fact an interaction between the virtualizer that has created the virtualization and the host operating system 64 and/or the computer hardware 62 as appropriate.

Storing Information Describing a VM and Its Use in a Virtual Disk Image

Figure 3:
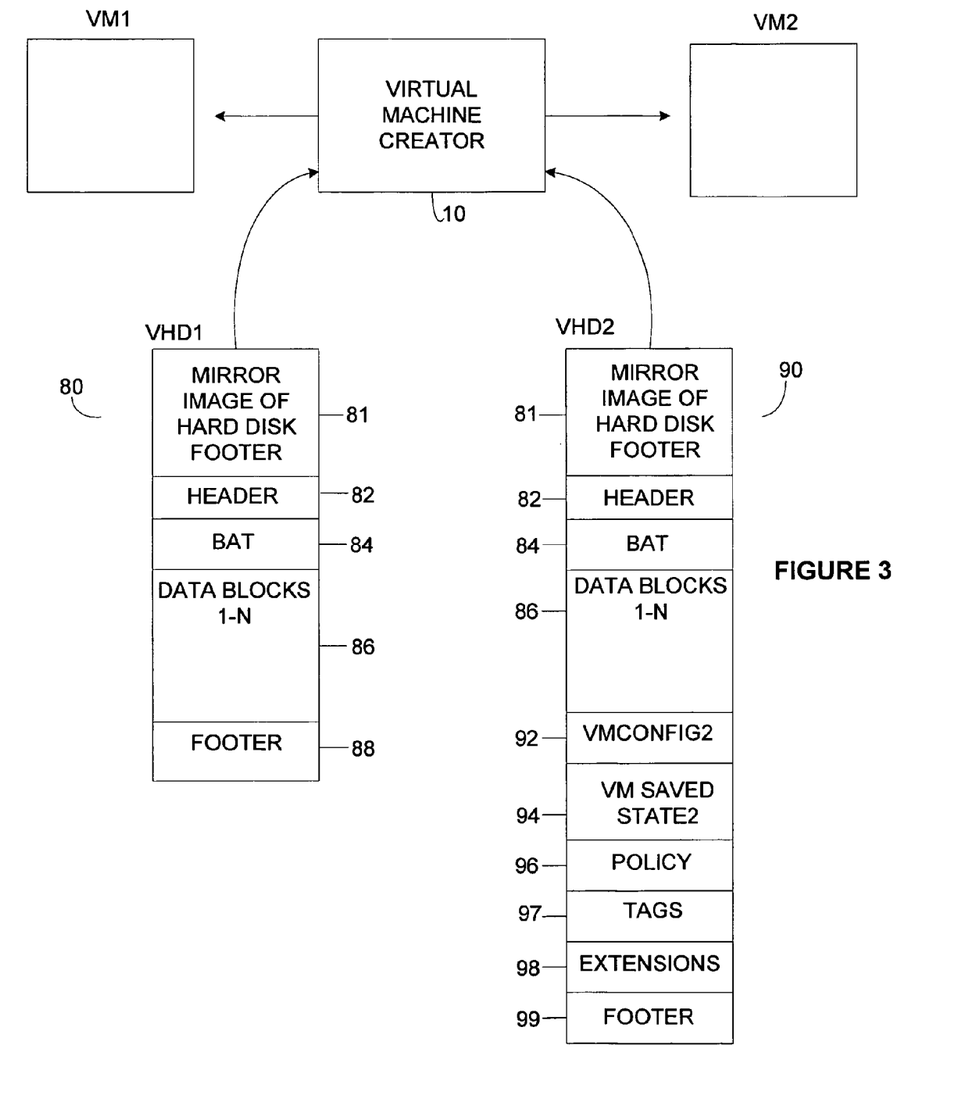
FIG. 3 illustrates virtual disk images files with formats expanded to include fields for storing information about the data in the virtual image file in accordance with the invention.

FIG. 3 illustrates an embodiment of the invention for making information about the virtual disk image file and/or its associated virtual image configuration file and saved state file more readily available. As in the embodiment of FIG. 1, virtual machine creator application 10 creates virtual machines (VM1, VM2) from VM configuration data and virtual disk image data. However, in accordance with the invention, the virtual disk image files are reformatted to provide significantly more functionality.

Conventional Virtual Disk Image File Format

Conventionally, in VM systems such as Virtual PC an Virtual Server available from Microsoft Corporation, virtual disk image files are formatted in one of several different virtual hard disk formats including: fixed hard disk, dynamic hard disk, and differencing hard disk. Each virtual hard disk type has its own file format, as explained below.

Fixed Hard Disk

A fixed hard disk is a file that is pre-allocated to its maximum size. For example, if one creates a virtual hard disk that is 2 GB in size, the system will create a 2 GB file on the host file system. The fixed hard disk image is a flat file with a hard disk footer at the end of the file. The size of the file is as large as the hard disk in the guest operating system; however, there are size limitations on a fixed hard disk due to the limitations of the host file system. A fixed hard disk cannot be bigger than 2 GB on a FAT 16 file system, and it cannot be greater than 4 GB on a FAT32 file system.

Dynamic Hard Disk

A dynamic hard disk is a file that grows in size as more data is written to it. For example, the size of a virtual 2 GB hard disk is initially only around 2 MB on the host file system and, as data is written to this image, it grows to a maximum size of 2 GB. Dynamic hard disks store metadata that is used to access the real data stored on the hard disk. In an exemplary embodiment, the maximum size of a sparse hard disk is 2040 GB. Although ATA hard disks have a 127 GB limit, SCSI hard disks should be able to utilize the whole hard disk.

The basic format of a conventional dynamic hard disk is shown as VHD1 in FIG. 3. As illustrated, the conventional dynamic hard disk 80 includes a mirror image of a hard disk footer 81 (512 bytes), a sparse drive header 82 (1024 bytes), BAT (Block Allocation Table) 84, data blocks 1-n (86), and a hard disk footer 88 (512 bytes). Every time a data block is added, the hard disk footer 88 has to be moved to the bottom of the file 80. Because the hard disk footer 88 is a crucial part of the hard disk, a backup copy of it is maintained.

Differencing Hard Disk

A differencing hard disk is a special form of virtual hard disk image. This type of hard disk is not independent like a fixed hard disk and a dynamic hard disk. This hard disk depends on another hard disk (parent hard disk) to be fully functional and may be of any of the mentioned hard disk types (including another differencing hard disk). After a differencing hard disk is attached to a virtual machine, all the data written by the virtual machine is stored on the differencing hard disk. In this fashion, the parent hard disk remains unmodified and all the changes are made to the differencing hard disk.

Hard Disk Footer Format

All hard disk images supported by Microsoft's Virtual PC and Virtual Server share a basic footer format. In the examples above, the footer 88 has 512 bytes and each hard disk type may extend the basic footer format within this scope according to its needs. All the metadata related to a hard disk is stored in big-endian format to allow for cross-platform compatibility. The format of the hard disk footer in an exemplary embodiment is listed in Table 1 below:

TABLE 1

| Hard disk footer fields | Size (bytes) |
| --- | --- |
| Format ID | 8 |
| Reserved | 2 |
| Features | 2 |
| File Format Version | 4 |
| Data Offset | 8 |
| Time Stamp | 4 |
| Creator Application | 4 |
| Creator Version | 4 |
| Creator Host OS | 4 |
| Original Size | 8 |
| Current Size | 8 |
| Drive Geometry | 4 |
| Drive Type | 4 |
| Checksum | 4 |
| Unique Id | 16 |
| Saved State | 1 |
| Reserved | 427 |

The following provides brief definitions of the hard disk footer fields.

Format ID

Format IDs are used to uniquely identify the original creator of the hard disk image. For example, the hard disk image may be created by Microsoft Virtual Server, Virtual PC, and other VM products.

Features

This is a bit field used to indicate specific feature support. For example, the hard disk image may have no special features enabled in it, may have a temporary bit set if the current drive is a temporary drive (thus indicating to an application that this drive is a candidate for deletion on shutdown), or may have a bit indicating the virtual hardware used to create the hard disk image. For example, setting this bit may indicate that the virtual motherboard was based on a particular chipset.

Reserved

This is a bit field reserved for future use. All bits should be set to zero. If any bit is not set to zero, the file uses a future version of this format and the application should not assume compatibility with this version.

File Format Version

This field is divided into a major/minor version. The least-significant 2 bytes are for the minor version and the most-significant two bytes are for the major version. The major version is incremented only when the file format is modified in such a way that it is no longer compatible with older versions of the VM software.

Data Offset

This field holds the absolute byte offset, from the beginning of the file, to the next structure.

Time Stamp

This field stores the creation time of a hard disk image.

Creator Application

This field is used to document which application created the hard disk (e.g., Microsoft Virtual PC or Microsoft Virtual Server).

Creator Version

This field holds the major/minor version of the application that created the hard disk image.

Creator Host OS

This field stores the type of host operating system (e.g., Windows, Macintosh, or Linux) this disk image is created on.

Original Size

This field stores the size, in bytes, of the hard disk at creation time.

Current Size

This field stores the current size of the hard disk in bytes and has a value that is the same as the original size when the hard disk is created. This value can change depending on whether the hard disk is expanded up to the size of the hard disk in the guest virtual machine.

Drive Geometry

This field stores the cylinder, heads, and sectors per track value for the hard disk. When a hard disk is configured as an ATA hard disk, the CHS values (that is, cylinder, heads, sectors per track) are used by the ATA controller to determine the size of the drive. When the user creates a hard disk of a certain size, the size of the hard disk image in the virtual machine is smaller than that created by the user. This is because CHS value calculated from the hard disk size is rounded down.

Drive Type

This field identifies the type of the image: fixed, dynamic, differencing, etc.

Checksum

This field holds a basic checksum of the hard disk footer.

Unique ID

Every hard disk has a unique ID stored in the hard disk. This is used to identify the hard disk. This is a 128 bit universally unique identifier (UUID). This field is used to link hard disks to create differencing hard disks.

Saved State

This field holds a flag that describes whether the system is in a saved state. If the hard disk is in the saved state, then operations such as compaction and expansion cannot be performed on that hard disk.

Reserved

This field contains zeroes. It is 427 bytes in size and pads the hard disk footer to 512 bytes. As will be explained in more detail below, the techniques of the invention may be implemented by inserting pointers to the newly added fields in this reserved section. Such pointers may be read by the application and used to read the corresponding data in the virtual disk image file of the invention.

Block Allocation Table and Data Blocks

The Block Allocation Table (BAT) 84 is a table of absolute sector offsets into the file holding the hard disk. The size of the BAT 84 is calculated during creation of the hard disk, and the number of entries in the BAT 84 is the number of blocks the hard disk is comprised of. Each entry is four bytes long. The BAT 84 is always extended to a sector boundary. Each entry in the BAT 84 points to a particular data block 86 in the hard disk, where the data block 86 is the actual data structure where the data is stored. The block has a header to the data, and the header is a bitmap of all the data sectors present in the block. Every bit in the header represents whether a particular sector in the block has been written to. This bitmap is used extensively for the differencing hard disk. The header is also padded to a sector boundary. The size of a block must be a power of two sectors. For normal hard disks, the size of a block is 4096 sectors or 2 MB.

Modified Virtual Disk Image of Invention

As illustrated in FIG. 3, the virtual disk image (VHD2) 90 in accordance with the invention shares the same basic format as VHD1 in that it also includes fields 82, 84, and 86; however, VHD2 also includes several new extensions to implement the desired features of the invention. It is noted that mirror image field 81 is changed in virtual disk image 90 by virtue of changes in footer 88, as explained below.

For example, as illustrated in FIG. 3, VHD2 includes a block 92 for storing the VM configuration file (VM CONFIG2) and a block 94 for storing the VM's saved state (VM SAVED STATE2) for VM2. Pointers to these blocks are provided in the reserved portion of modified footer 99 so as to allow access by application programs to the VM configuration file and the VM's saved state without starting up the VM. As a result, all information needed to create a VM is in the virtual disk image such that should a user desire to move a VM from one physical machine to another, the user need only move VHD2. Also, since VHD2 includes both the virtual disk image and VM configuration files, the user may be assured that a particular VM configuration file is used with a particular virtual disk image. Also, if the corresponding virtual machine is check-pointed, then multiple saved state files that represent the virtual machine at different points in time may be conveniently maintained in the VM's saved state block 94. Since the saved state and configuration data is stored together, no additional management is required.

As another example, VHD2 may also include a block 96 that stores usage policy data for VM2, such as licenses of users, whereby the machine configuration of a particular virtual disk image may be locked down in VHD2 itself. A pointer to this blocks is also provided in the reserved portion of modified footer 99 so as to allow access by application programs to the VM policy information without starting up the VM. Generally speaking, block 96 stores information that can help a policy engine make decisions on whether the virtual disk image (VHD2) could be used by a particular hardware environment, or by a particular user, thus permitting a user to create a virtual disk image and install operating systems and/or applications and to safely distribute the VM on the Internet since a policy engine can decide if a particular user may or may not use the operating system/application present in a received virtual disk image. The information stored in block 96 may also specify the type of physical hardware on which the operating system inside the virtual hard disk image can run. This information enables a policy engine to decide if a VM system can move a live VM to another physical machine. A robust timeout policy may be implemented by storing time out data in block 96. For example, an administrator's application may read the time out data in block 96 and publish virtual disk images only for a certain period or only during a certain period of time in the day in accordance with the stored time out data. The block 96 may also store DRM information so as to allow VHD2 to be used as a vehicle for software distribution over a public network, such as the Internet, to users who would be able to download their license keys separately to use the virtual disk image. Also, the policy data in block 96 may include network environment information so as to allow an application program to control the usage of VHD2 in a particular network environment specified by the stored data. For example, a system administrator may setup certain virtual machines so that they can run only in a secure network environment.

As further illustrated in FIG. 3, the virtual disk image 90 may also include a tag block 97 that stores data identifying the stored data in the virtual disk image 90 (e.g., by name of OS application) so that VM users may quickly search the virtual disk image 90 to determine its contents by reading the tags 97 and indexed the data using an indexing engine that quickly retrieves a particular disk image. Some of the things that a user may prefer to tag include the operating system name and version, intended workload (e.g., application server versus database), the person or organization who created the image, the person or organization responsible for maintaining and patching the image, hardware (performance, bandwidth, topology) requirements or preferences for the workload contained within the image, applications installed in the virtual disk image and their versions, and any custom tag that is related to a user's environment. As with the other sections, a point to the tag block 97 may be provided in the reserved section of footer 99 so as to allow access by application programs to the tag data without starting up the VM.

FIG. 3 also illustrates an "extensions" section 98 that may be added to the virtual disk image 90 in accordance with the invention for extensible storage of content information about the virtual image disk data. For example, such data may be stored in the form of XML since the schema may be extended without modifying the virtual disk image file format. This extensibility will allow other vendors to add more information to the virtual disk image. Such extensible data may let the user store notes related to a virtual machine and to append information to this field. For example, the user may maintain a history of different operations that have been performed on a particular virtual disk image indicating, for example, whether the data content is textual or binary, and whether it has been modified. The extensions section may also allow third party vendors to add custom information without modifying the VHD file format. Thus, as in the example above, an anti-virus product may store some information in section 98 that indicates whether VHD2 has been checked for infection. Extensions section 98 may also store information that provides more detail about what data is stored in VHD2 and the characteristics of that data. As in the above example, the data in section 98 may indicate whether VM2 has been patched or not. If it has been patched, the patch information may be stored in section 98 as well so that the user may determine to what level VM2 has been patched and whether it is safe to start up VM2 or not without starting the VM.

Though the extensible data is stored in the virtual disk image as XML data in an exemplary embodiment of the invention, those skilled in the art will appreciate that other extensible and/or hierarchical file formats may also be used to provide third party extensibility of the techniques of the invention.

Exemplary Networked and Distributed Environments

One of ordinary skill in the art can appreciate that the invention can be implemented in connection with any suitable host computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with virtualizing a guest OS in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 4A:
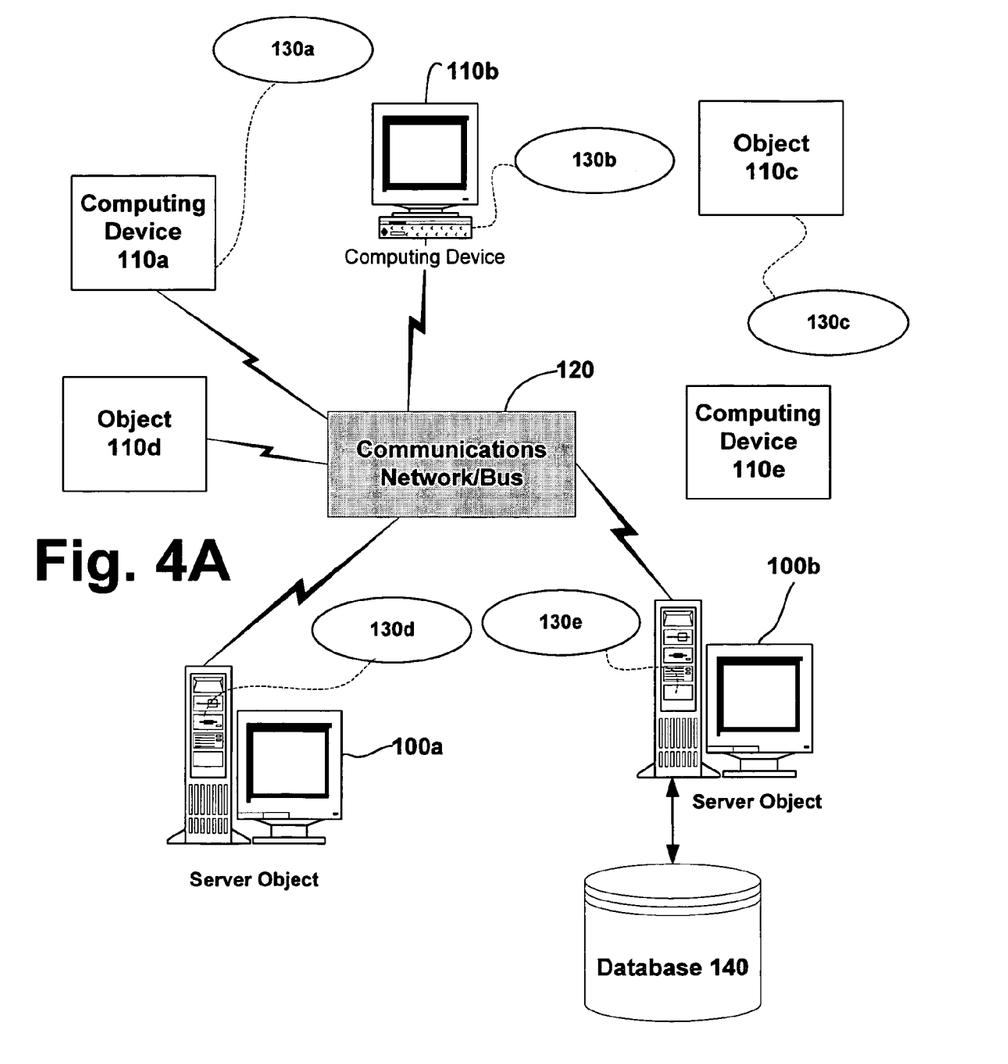
FIG. 4A is a block diagram representing an exemplary network environment having a variety of computing devices in which the present invention may be implemented.

FIG. 4A provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 120. This network may itself comprise other computing objects and computing devices that provide services to the system of FIG. 4A, and may itself represent multiple interconnected networks. In accordance with an aspect of the invention, each object 100a, 100b, etc. or 110a, 110b, 110c, etc. may contain an application that might make use of an API, or other object, software, firmware and/or hardware, to request use of the virtualization processes of the invention.

It can also be appreciated that an object, such as 110c, may be hosted on another computing device 100a, 100b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the virtualization processes of the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized services in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 4A, computers 110a, 110b, etc. can be thought of as clients and computers 100a, 100b, etc. can be thought of as the server where server 100a, 100b, etc. maintains the data that is then replicated in the client computers 110a, 110b, etc., although any computer can be considered a client, a server, or both, depending on the circumstances. Any of these computing devices may be processing data or requesting services or tasks that may implicate an implementation of the architectures of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture(s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 4A illustrates an exemplary networked or distributed environment, with a server in communication with client computers via a network/bus, in which the present invention may be employed. In more detail, a number of servers 100a, 110b, etc., are interconnected via a communications network/bus 120, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like. It is thus contemplated that the present invention may apply to any computing device in connection with which it is desirable to implement guest interfaces and operating systems in accordance with the invention.

In a network environment in which the communications network/bus 120 is the Internet, for example, the servers 100a, 110b, etc. can be Web servers with which the clients 110a, 110b, 110c, 110d, 110e, etc. communicate via any of a number of known protocols such as HTTP. Servers 100a, 110b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 120, and may have independent communications associated therewith. For example, in the case of a TV or VCR, there may or may not be a networked aspect to the control thereof. Each client computer 110a, 110b, 110c, 110d, 110e, etc. and server computer 100a, 110b, etc. may be equipped with various application program modules or objects 130 and with connections or access to various types of storage elements or objects, across which files or data streams may be stored or to which portion(s) of files or data streams may be downloaded, transmitted or migrated. Any one or more of computers 100a, 100b, 110a, 110b, etc. may be responsible for the maintenance and updating of a database 140 or other storage element, such as a database or memory 140 for storing data processed according to the invention. Thus, the present invention can be utilized in a computer network environment having client computers 110a, 110b, etc. that can access and interact with a computer network/bus 120 and server computers 100a, 100b, etc. that may interact with client computers 110a, 110b, etc. and other like devices, and databases 140.

Exemplary Computing Device

Figure 4B:
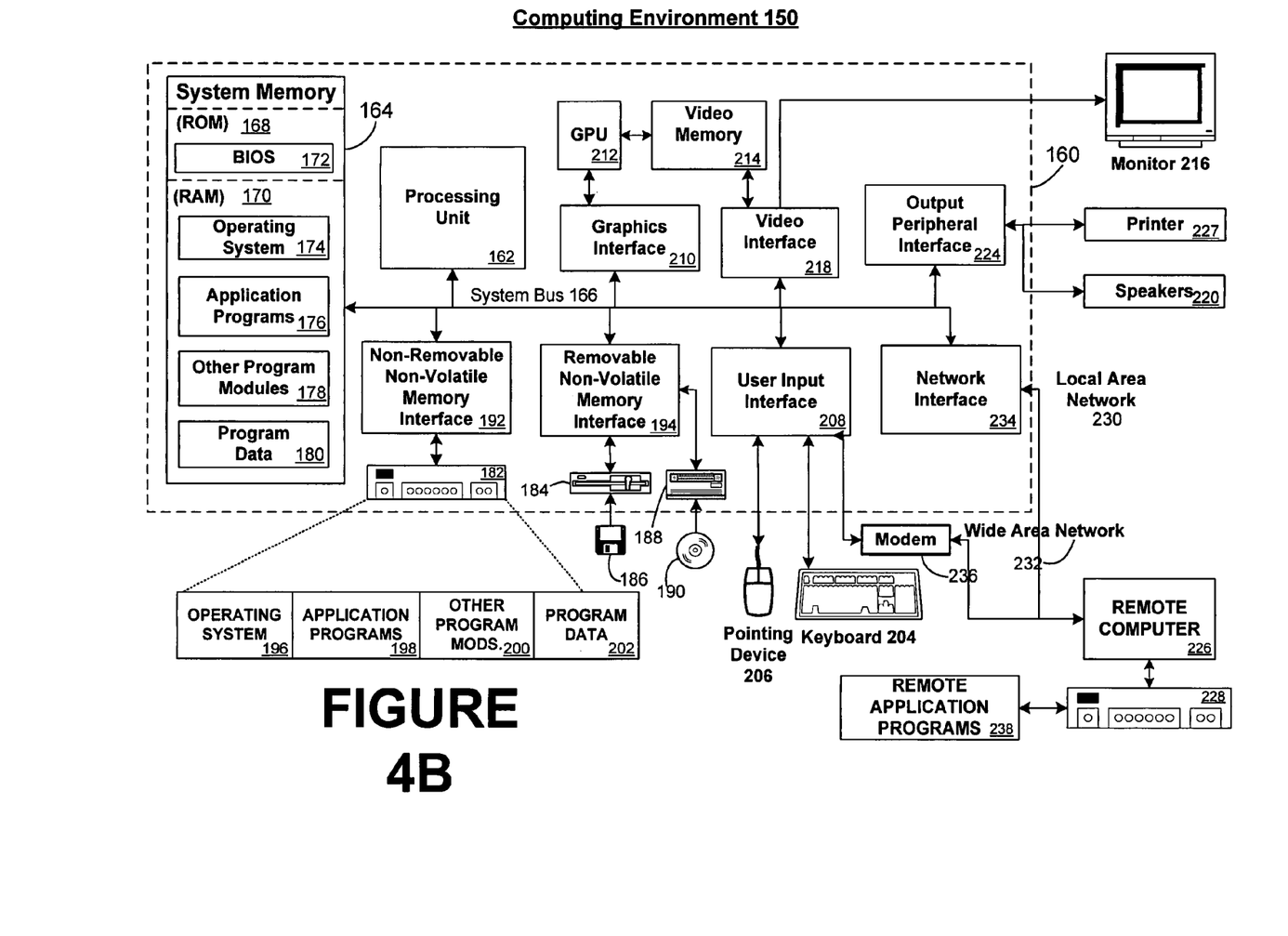
FIG. 4B is a block diagram representing an exemplary non-limiting host computing device in which the present invention may be implemented.

FIG. 4B and the following discussion are intended to provide a brief general description of a suitable host computing environment in connection with which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the virtualization techniques in accordance with the invention.

Although not required, the invention can be implemented in whole or in part via an operating system, for use by a developer of services for a device or object, and/or included within application software that operates in connection with the virtualized OS of the invention. Software may be described in the general context of computer executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand held or laptop devices, multi processor systems, microprocessor based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 4B illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 4B, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during start-up, is typically stored in ROM 168. RAM 170 typically contains data and/or program modules that are immediately accessible to and/or presently being operated on by processing unit 162. By way of example, and not limitation, FIG. 4B illustrates operating system 174, application programs 176, other program modules 178, and program data 180.

The computer 160 may also include other removable/non-removable, volatile/nonvolatile computer storage media. By way of example only, FIG. 4B illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 4B provide storage of computer readable instructions, data structures, program modules and other data for the computer 160. In FIG. 4B, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that are virtualized by the architectures of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 4B. The logical connections depicted in FIG. 4B include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 4B illustrates remote application programs 238 as residing on memory device 228. It will be appreciated that the network connections shown are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the virtualization techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a guest OS virtualized on a host OS, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the guest OS is used. It is also intended that the invention applies to all computer architectures, not just the Windows architecture. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system comprising:
at least one processor;
at least one memory communicatively coupled to said at least one processor, the memory having stored therein computer-executable instructions that, upon execution by the at least one processor, cause the system to at least:
obtain a static virtual disk image of a virtual machine, the static virtual disk image comprising one or more sections including a virtual machine configuration information section, the virtual machine configuration information section containing only configuration information about the virtual machine and accessible by an application independently from accessing other sections of the static virtual disk image, said virtual machine configuration information section comprising an extensions section for providing extensible storage of content information associated with the static virtual disk image;
read only the virtual machine configuration information section included in the static virtual disk image without accessing the other sections included in the virtual disk image and without attaching the static virtual disk image to the virtual machine, launching the virtual machine, and reading the virtual machine configuration information through the virtual machine;
determine, based on the virtual machine configuration information section, virtual machine configuration data for loading and executing the virtual machine; and
instantiate the virtual machine using the virtual machine configuration data and the static virtual disk image.

2. The system as in claim 1, wherein said virtual machine configuration information section includes a pointer to a portion of said virtual disk image containing desired content information.

3. The system as in claim 1, wherein said virtual machine configuration information section includes information identifying whether one or more application programs in said virtual disk image has been patched.

4. The system as in claim 1, wherein said virtual machine configuration information section includes usage policy data for applications in said virtual disk image and said another application comprises a usage policy engine that determines from said usage policy data whether a particular user may or may not use an operating system or application programs within said virtual disk image.

5. The system as in claim 1, wherein said virtual machine configuration information section includes migration policy data for applications in said virtual disk image.

6. The system as in claim 1, wherein said virtual machine configuration information section includes time out data for said virtual disk image or application programs within said virtual disk image.

7. The system as in claim 1, wherein said virtual machine configuration information section includes digital rights management (DRM) data for said virtual disk image or application programs within said virtual disk image.

8. The system as in claim 1, wherein said virtual machine configuration information section includes tag data that indexes the contents of said virtual disk image.

9. The system as in claim 8, configured to use at least two virtual disk images having tag data that indexes the contents of said virtual disk images, said indexing engine configured to search said tag data to locate a desired virtual disk image of said at least two virtual disk images.

10. The system as in claim 1, wherein said tag data includes data relating said machine to be virtualized to a particular user environment.

11. The system as in claim 1, wherein said virtual machine configuration information section includes network environment data for said virtual disk image.

12. The system as in claim 1, wherein said machine configuration data is stored in said virtual disk image.

13. The system as in claim 1, wherein at least one saved state of said machine to be virtualized is stored in said virtual disk image.

14. The system as in claim 1, wherein said virtual machine configuration information section includes user notes relating to modification of said machine to be virtualized.

15. The system as in claim 1, wherein said virtual machine configuration information section is stored in said virtual disk image in an extensible file format.

16. The system as in claim 15, wherein said extensible file format is Extensible Markup Language (XML).

17. A computer implemented method of creating a virtual machine (VM), comprising:
obtaining a virtual disk image of a virtual machine, the virtual disk image comprising one or more sections including a virtual machine configuration information section, the virtual machine configuration information section containing configuration information about the virtual machine and accessible by an application independently from accessing other sections of the one or more sections, said virtual machine configuration information section comprising an extensions section for providing extensible storage of content information associated with the virtual disk image;
reading virtual machine configuration data for the virtual machine from the virtual machine configuration information section, the virtual machine configuration data comprising information for a plurality of saved states that represent the VM at different points in time whereby said virtual machine configuration information section may be accessed and read from said virtual disk image without accessing the other sections in the virtual disk image and without attaching the virtual disk image to the VM, launching the VM, and reading the virtual machine configuration information through the VM;
determining, based on the virtual machine configuration information section, virtual machine configuration data for loading and executing the virtual machine;
creating said virtual machine from the virtual machine configuration data and the virtual disk image.

18. The method of claim 17, wherein said reading comprises reading a pointer to a portion of said virtual disk image containing said machine configuration data.

19. The method of claim 17, wherein said machine configuration data is stored in said virtual disk image.

20. A computer readable storage medium comprising computer executable instructions for extending a virtual machine (VM) disk image, the computer readable medium comprising computer executable instructions for:
creating a virtual disk image file comprising a virtual disk image of a machine to be virtualized and machine configuration data, said virtual disk image and said machine configuration data being usable by a virtual machine creation application configured to create a VM having a virtual hard disk including contents of said virtual disk image and a machine configuration specified by said machine configuration data, said machine configuration data being stored in a section within the virtual disk image and accessible without accessing other sections in the virtual disk image and without attaching the virtual disk image to the virtual machine, launching the virtual machine, and reading the virtual machine configuration information through the virtual machine, said virtual machine configuration information section comprising an extensions section for providing extensible storage of content information associated with the static virtual disk image, said virtual machine configuration information section usable to determine virtual machine configuration data for loading and executing the VM and instantiating the VM using the virtual machine configuration data and the virtual disk image.

* * * * *